UNITED STATES PATENT OFFICE.

NATHAN SULZBERGER, OF NEW YORK, N. Y.

CHEWING-GUM CONTAINING PHARMACEUTICAL PREPARATIONS.

1,038,227.      Specification of Letters Patent.      Patented Sept. 10, 1912.

No Drawing.      Application filed July 25, 1911. Serial No. 640,483.

*To all whom it may concern:*

Be it known that I, NATHAN SULZBERGER, a citizen of the United States of America, residing at Hotel Netherland, Fifty-ninth street and Fifth avenue, New York city, in the county of New York and State of New York, have invented new and useful Improvements in Chewing-Gums Containing Pharmaceutical Preparations, of which the following is a specification.

A great many of the pharmaceutical preparations which are to be used internally are today put up in tablet, etc., form. This method, however, has a great disadvantage—in very many cases the active compounds contained in these tablets are not disintegrated, or not rapidly enough, and therefore, in many instances leave the system without exercising their desired beneficial action.

I have found that by embodying, mixing, etc., pharmaceutical preparations for internal use in a gum, chewing gum, that the above referred to disadvantages occasioned when such preparations are used in tablet, etc., form are overcome. When such preparations are embodied, mixed in, or dissolved into a chewing gum, these preparations are when such gum is chewed by the process of mastication, more or less rapidly extracted or separated from the gummy substance in which they were embedded, and therefore enter the stomach and intestinal tractus either in the form of a solution in saliva and secretions of the mouth or in a more or less finely divided condition. In some instances it will be preferable to embody the substances into such gums directly; in other cases, such active substances will best be first dissolved or embodied in the form of an emulsion. In many cases, as particularly when laxatives are embodied in such gum-like substances, the mixture of the saliva and other secretions of the mouth may even enhance the desired action of these preparations just by virtue of this addition.

As an example of my invention I cite a chewing-gum containing about two grains of phenolphthalein. This product does not in any way interfere with the flavor or appearance of the chewing-gum. Other laxatives may be derived by embodying the valuable principle or principles of aloe, cascara, podophyllin, etc. Of course, the active substances of preparations producing other physiological effects may also be embodied in such gum, etc. These substances and their mixtures may be embodied in pieces of gum in such shape as they are today commonly put on the market. The consumer can easily, himself, select the amount desired of the substance contained in the gum by either taking one or more pieces of such gum, or if he desires a smaller dosis, by taking only part of a piece. These pieces may be marked in certain ways in order to guide him in selecting the desired dosis. The gum may contain outside of the active principle of the desired substance, also additions of such materials as will help to enhance the flow of the secretions of the mouth. It may also contain substances which will increase the solubility of the active product contained in the gum in these secretions, also substances which will improve the flavor and taste may be added.

Under the term gum, chewing gum, I wish to include all such materials of a gum-like nature, as for instance: chicle, stearin, beeswax, paraffin, etc., which form a continuous gum-like mass practically insoluble in secretions of the mouth and of the general behavior of ordinary chewing-gum when masticated.

I claim:

1. A chewing-gum containing phenolphthalein.

2. A chewing gum containing a synthetic stable preparation, such preparation being white and practically devoid of any odor and taste, possessing laxative action.

NATHAN SULZBERGER.

Witnesses:
    JOHN SCHMITT,
    WM. C. BUETHE,